United States Patent
Wurm

[11] 3,716,988
[45] Feb. 20, 1973

[54] PRESSURE TRANSLATING APPARATUS AND PROCESS
[75] Inventor: Jaroslav Wurm, Cicero, Ill.
[73] Assignee: The Institute of Gas Technology, Chicago, Ill.
[22] Filed: Jan. 20, 1971
[21] Appl. No.: 108,115

[52] U.S. Cl. ............................................. 60/24, 62/6
[51] Int. Cl. .......... F03g 7/06, F25b 1/00, F25b 27/00
[58] Field of Search ................................. 62/6; 60/24

[56] References Cited

UNITED STATES PATENTS

| 3,248,870 | 5/1966 | Morgenroth | 60/24 |
| 3,413,815 | 12/1968 | Granryd | 60/24 X |
| 3,491,554 | 1/1970 | Granryd | 60/24 X |

Primary Examiner—Martin P. Schwadron
Assistant Examiner—A. M. Ostrager
Attorney—Alexander & Speckman

[57] ABSTRACT

An apparatus and process for conversion of thermal energy into mechanical energy having a portion of the working fluid of a heat engine isolated from the active volume of the heat engine for adiabatic expansion to about the lowest pressure of the heat engine cycle and return of said portion of working fluid to the heat engine during the latter portion of the cooling cycle of the heat engine. In one embodiment the working fluid of a heat engine is in direct communication with a primary expansion pressure sensitive means for primary conversion of thermal energy to mechanical energy, and then a portion of the partially de-energized working fluid is isolated from the active volume of the heat engine and in communication with a secondary expansion means such as a piston or rotary expander wherein the working fluid with the energy remaining after expansion in the primary expansion means is further adiabatically expanded to about the lowest pressure of the heat engine cycle after which the working fluid is returned to the heat engine. The apparatus is particularly advantageously used as a prime mover and in conjunction with a cooling device or other pumping systems.

6 Claims, 9 Drawing Figures

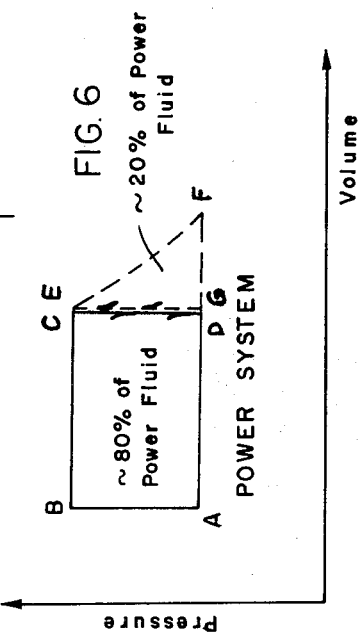
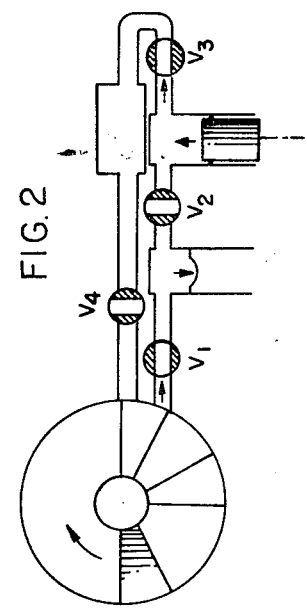
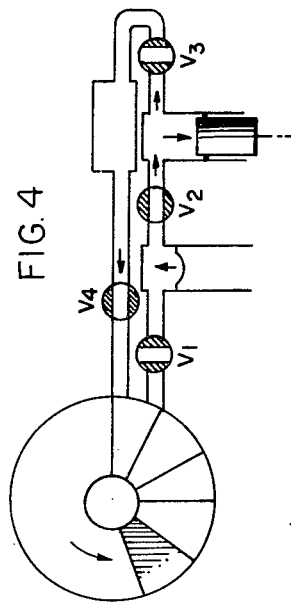
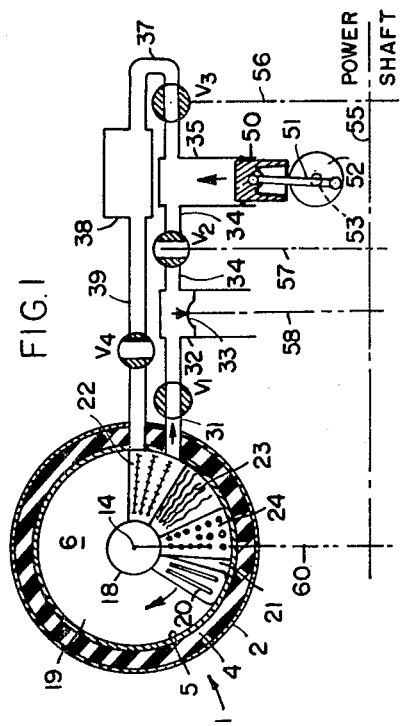
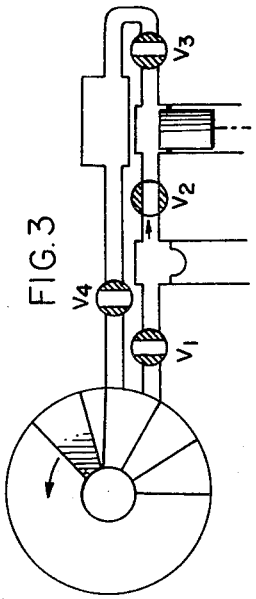
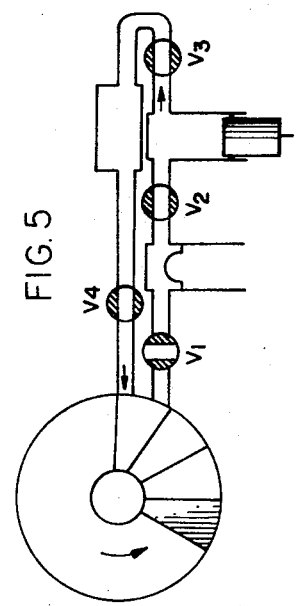

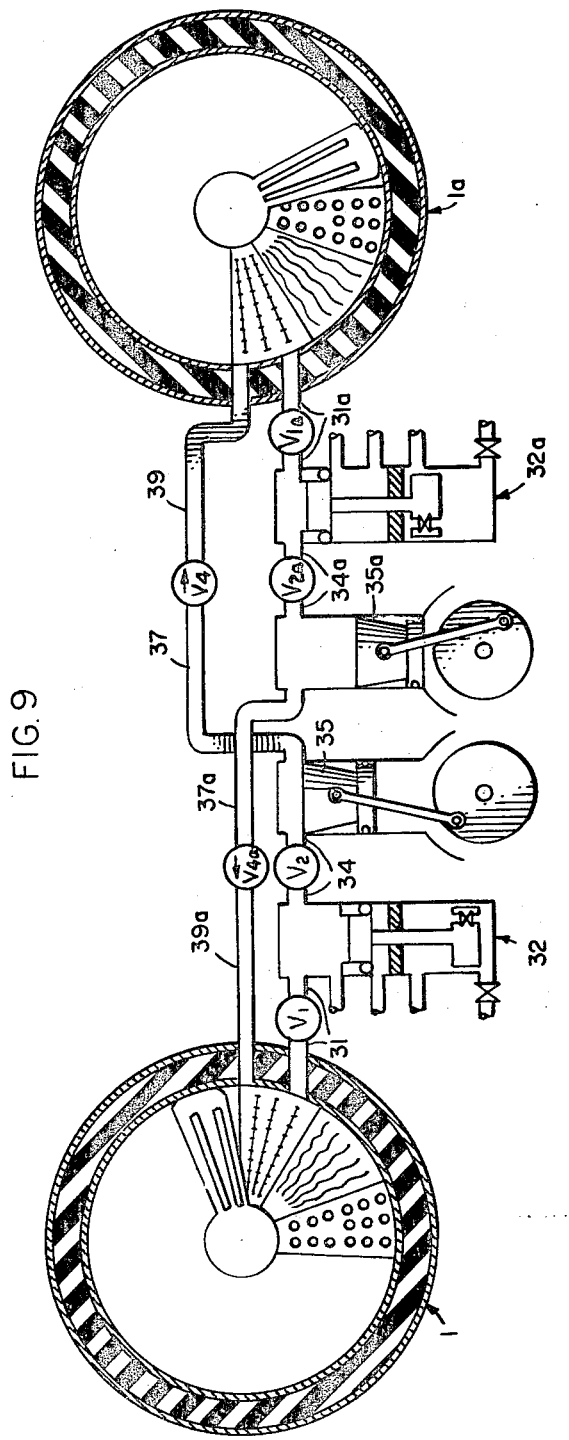

PRESSURE TRANSLATING APPARATUS AND PROCESS

BACKGROUND OF THE INVENTION

Heretofore, heat-actuated regenerative compressors have been used to power refrigerating systems as described in U.S. Pat. Nos. 3,474,641 and 3,491,554. Other types of external combustion heat engines have been well known in the art for many years to function as prime movers and to provide for conversion of thermal energy into mechanical energy. External combustion heat engines have not gained general acceptance due to low overall efficiency and/or mechanical complexity. One of the principal reasons for the minimal acceptance of the external combustion heat engines in certain applications, such as air conditioning, has been their relatively low efficiency in conversion of thermal energy to mechanical energy. External combustion heat engines, including some applications of the heat-actuated regenerative compressors of the prior art, have not been utilized in a manner to obtain maximum output of mechanical energy and in a manner providing the most efficient utilization of thermal energy.

In the operation of the external combustion heat engine it is also advantageous to the overall efficiency of these engines to use the expansion phase which yields the maximum work output for all of the working fluid and reduces the working fluid to the lowest after expansion average temperature-pressure condition. This also reduces the load on the internal or external cooler of the external combustion engine and in the case of an internal cooler it thus conserves the working volume of the engine. Only through improved efficiency and/or reduced mechanical complexity can thermal engines become generally accepted by industry.

DESCRIPTION OF THE INVENTION

My invention comprises a novel combination and configuration of components providing operation of heat engines generally, and heat-actuated regenerative compressors particularly, at greatly improved ratios of mechanical energy output to overall energy input than previous heat engine - mechanical output devices. By the term heat engine, as used throughout this disclosure and claims, I mean devices in which the principal source of energy is due to cyclic thermal changes. By external combustion heat engine I mean that the heat is supplied from an external source, and by internal combustion heat engine, I mean that the source of heat is within the engine. An example of a suitable internal combustion heat engine is described in pending U.S. Pat. application Ser. No. 91,833 entitled "Internal Combustion Heat Engine and Process," Eric G. U. Granryd, filed Nov. 23, 1970. Internal combustion engines in which the ignited fuel burns rapidly causing an explosion, such as the conventional gasoline and diesel engines, have an entirely different pressure-volume diagram and are not suitable for use in my invention.

The device of my invention comprises a heat engine, such as a heat-actuated regenerative compressor, in combination with an expansion device which extracts work such as a piston or rotary expander and is isolated from the active volume of the compressor and is at different pressures and temperatures than the compressor at the time of extraction of energy. In one embodiment the apparatus comprises primary expansion pressure sensitive means for conversion of energy derived from heat in the working fluid of the heat engine into mechanical energy, and a secondary expansion means providing adiabatic expansion of a part of the working fluid of the heat engine into mechanical energy for use as a prime mover or to drive associated equipment, including, for example, a refrigeration system. Both the primary and secondary expansion means may be any type of pressure exchanger, such as a semi static pressure exchanger.

The mechanical energy output of the secondary expansion means may be utilized to operate accessory equipment, provide energy input for operation of the heat engine, such as the vane in a heat-actuated regenerative compressor, and/or added to the principal energy output of the overall unit. The secondary expansion means may be any polytropic expansion device, preferably approaching adiabatic, which extracts work and is preferably a piston expander or a rotary expander. Further references to adiabatic conditions include those conditions approaching adiabatic as the term is used by those skilled in the arts relating to the thermodynamic reference expansion.

The apparatus of my invention may be used as a prime mover or may be used directly in combination with various pneumatic or fluid devices.

Still further, my invention comprises a heat-actuated regenerative compressor in combination with a cooling or refrigeration system in which a gas having a high thermal-conductivity and specific heat ratio is used as the working fluid in the heat-actuated regenerative compressor which furnishes energy through a primary expansion pressure sensitive means and further passes the working fluid in communication with a secondary expansion means wherein energy remaining after expansion in the primary expansion means is further extracted by adiabatic expansion of the working fluid to or about the lowest pressure of the heat engine cycle. The output provides mechanical energy to pump any efficient refrigerant having a high specific heat of evaporization through a Rankine cooling cycle.

It is an object of my invention to provide a pressure translating apparatus providing improved ratios of mechanical energy output to energy input than previous heat engine - mechanical output devices.

Further, an object of my invention is to provide a process for more efficient utilization of heat engines by adiabatically expanding the working fluid of the engine following the principal energy translation of the thermal engine output.

It is another object of my invention to provide a heat-actuated regenerative prime mover which furnishes a higher ratio of mechanical energy output to energy input and/or greater simplicity of mechanical design than previously available.

It is still another object of my invention to provide an improved cooling system powered by a heat-actuated regenerative compressor having internal thermal exchangers wherein the overall coefficient of performance is higher than previously obtainable.

These and other important objects will become apparent from the following description taken in conjunction with the drawings showing preferred embodiments wherein:

FIG. 1 through FIG. 5, inclusive, schematically illustrate the operating principles of one embodiment of the device of this invention;

FIG. 6 is a graph illustrating the pressure-volume relationship of the working fluid in an apparatus according to the embodiment of this invention shown in FIG. 1 through FIG. 5;

FIG. 9 shows a specific embodiment of the invention utilizing two heat-actuated regenerative compressors permitting harmonic operation.

Figure 7:
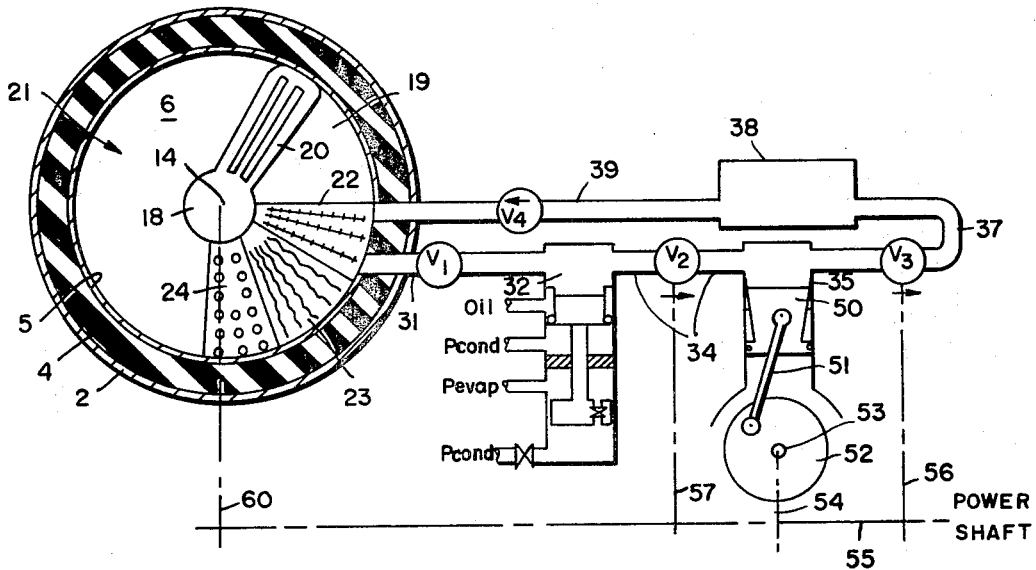
FIG. 7 illustrates the cooling system of the invention in a specific embodiment.

Referring specifically to FIG. 1, the heat-actuated regenerative compressor 1 comprises outer shell casing 2, insulation 4 and inner shell casing 5 defining gas chamber 6 which is generally cylindrical in shape. Shaft 14 is disposed through chamber 6, and retained in a suitable rotatable relationship by bearing means. Shaft 14 penetrates casing 5 in fluid tight relationship and is connected through suitable linkage means to a power source (not shown) which causes shaft 14 to undergo an oscillating movement. Secured to shaft 14 is insulating hub 18 having vane 20 constructed of suitably supported thermal insulating material extending to and congruent with inner shell casing 5.

Vane 20 divides chamber 6 into a first "cold" section 19 and a second "hot" section 21. Positioned within chamber 6 from inner shell casing toward the center of chamber 6 to hub 18 extending substantially the entire length of chamber 6 separating cold section 19 from hot section 21 are cooling means 22, heat regenerative means 23, and heating means 24. The heat-actuated regenerative compressor is described in more detail in U.S. Pat. Nos. 3,474,641 and 3,491,554.

Briefly, operation of the compressor is achieved by moving gas from cold section 19 in order through the cooler-regenerator-heater into hot section 21 at an average higher temperature-pressure relationship and then returning the gas from hot section 21 in order back through the heater-regenerator-cooler to cold section 19 at an average lower temperature-pressure relationship. Vane frequencies of from about 15 to 500 cycles per minute are suitable for such a compressor.

The pressure translating device of my invention is shown in a preferred embodiment in FIG. 1. The device of my invention is isolated from the active volume of the compressor during the first portion of the cooling phase of the cycle of the working fluid of the compressor. Referring specifically to FIG. 1, first conduit 31 has a first end in communication with the active volume of the heat-actuated regenerative compressor, preferably in an area near the regenerator side of the cooler, and a second end in communication with primary expansion pressure sensitive means 32. Valve $V_1$ is in conduit 31. Primary expansion pressure sensitive means 32 may be mechanical, pneumatic, or hydraulic linkages to convert the energy derived from the working fluid of the heat engine which is in contact with one side of the pressure sensitive means into mechanical energy. Any of the pressure responsive means as illustrated in U.S. Pat. No. 3,491,554 are suitable. Bellows of suitable material and design to permit the required flexing and expansion while at the same time maintaining gas-tight relation to retain the compressor working fluid on one side of the bellows are preferred. A preferred embodiment utilizes bellows such as a Bellofram seal in conjunction with a piston. Metal bellows are most satisfactory using copper, nickel and various stainless steel alloys or mixtures of copper and nickel. Other flexible materials such as butyl rubber or synthetic polymeric materials may be used if they do not permit diffusion of gases from the closed system containing the working fluid. FIGS. 1 through 5 schematically show membrane 33 as a pressure sensitive means.

Second conduit 34 has a first end in communication with primary expansion means 32 and a second end in communication with secondary expansion means 35 providing adiabatic expansion of the working fluid of the heat engine to or near the lowest pressure of the heat engine cycle. Valve $V_2$ is in conduit 34. Secondary expansion means 35 may be any expansion device which extracts work, preferably a piston expander or a rotary expander, a screw-type expander, a vane-type expander or a Roots expander. Such means for adiabatic expansion are known to those skilled in the art. FIG. 1 illustrates the secondary expansion means as a piston-type expander having piston 50 with connecting rod 51 attached to fly wheel 52 which is rotably mounted to shaft 53. Piston 50 must operate in substantially fluid-tight relationship so as to contain the working fluid of the compressor in the closed system. One preferred method is to utilize a Bellofram seal backed by a pressurized oil system. The Bellofram material is suitably butyl rubber or a laminated structure embodying Saran.

Conduit 37 has a first end in communication with secondary expansion means 35 and a second end in communication with surge tank 38. Valve $V_3$ is in conduit 37. Surge tank 38 is preferred to permit harmonic operation of the heat-actuated regenerative compressor and the secondary expansion means, but is not a necessary element of the apparatus of my invention. The size of surge tank 38 is determined by the overall volume and pressure ranges of the heat-actuated regenerative compressor and pressure translating system.

Conduit 39 has a first end in communication with surge tank 38 and a second end in communication with the heat-actuated regenerative compressor active volume, preferably near the cold volume side of the cooler. Valve $V_4$ is in conduit 39. Valve $V_4$ is preferably operated by the differential in pressure between the active volume of the heat-actuated regenerative compressor and the surge tank such that when the pressure is lower in the active volume of the compressor valve $V_4$ opens. Alternatively, valve $V_4$ may be connected to the power-synchronization system described below for the other valves.

Vane 20 of the heat-actuated regenerative compressor is driven and synchronized by linkage means 60 from power shaft 55. Valve $V_1$ can be a pressure operated check valve or a synchronized mechanically operated valve. It is preferred that valve $V_1$ be a pressure operated check valve. Primary expansion means 32 is shown connected by linkage 58 with power shaft 55 for principal power output. However, as shown in FIG. 7, primary expansion means 32 may not be linked to power shaft 55 if the principal energy output is used directly from the primary expansion means. Valve $V_2$ is driven and synchronized by linkage means 57 with shaft 55. Fly wheel 52 of secondary expansion means 35 may directly transfer output power by shaft 53 or may be connected by linkage means 54, as shown in FIG. 7, to transfer output power to shaft 55. Valve $V_3$ is driven and synchronized by linkage means 56 with shaft 55. The linkage means may be of any suitable mechanical, pneumatic or electromechanical type and synchronization may be obtained by use of cams, electromechanical means, or other methods known to the art. The sequence and synchronization of operation of the valves and other components is described in the further description of operation of the apparatus. As shown in FIGS. 1 through 5 the primary and secondary expansion means are approximately 180° out of phase. The primary and secondary expansion means must be out of phase, the degree out of phase depending upon the number of expansion means in series, valving, and energy differential. While shaft 55 is shown as a single shaft, any suitable means affording synchronization and power supply or take off may be used.

As shown in FIG. 1, the heat-actuated regenerative compressor is at its lowest temperature-pressure relationship and consequently the working fluid of the compressor at its lowest volume of the cycle. As the vane 20 starts the heating portion of the cycle by its clockwise motion as shown in FIG. 1, valve $V_1$ is opened placing primary expansion means 32 in direct communication with the active volume of the heat-actuated regenerative compressor. Valve $V_2$ is maintained in the closed position isolating the secondary expansion means from the primary expansion means. Valve $V_1$ is retained in the open position during the clockwise movement of vane 20 as shown in FIG. 2 until the working fluid of the heat-actuated regenerative compressor has obtained maximum temperature-volume relationship and has transferred a portion of the working fluid of the compressor to the expanded volume of primary expansion means 32. Referring to FIG. 6, the idealized increase in pressure during the heating portion of the cycle is represented by line AB and the expansion taking place in the primary expansion means represented by line BC. Valve $V_1$, in this idealized case, opens at point B.

As vane 20 starts counterclockwise rotation as shown in FIG. 3, the overall temperature-pressure relationship in the active volume of the compressor lowers. Valve $V_1$ is closed isolating the pressure translating apparatus from the active volume of the compressor and valve $V_2$ is opened permitting communication between the primary expansion means and the secondary expansion means. Following expansion in the primary expansion means, the working fluid is at a higher temperature-pressure relationship than the lowest temperature-pressure relationship of the active volume of the heat-actuated regenerative compressor at the initiation of the cycle as shown in FIG. 1. Adiabatic expansion takes place in the secondary expansion means 35 driving piston 50 downward and imparting mechanical energy to fly wheel 52. The adiabatic expansion in the secondary expansion means is shown by line EF in FIG. 6, where the initial state E indicates only the initial pressure and not the initial temperature of the expanding working fluid.

After the maximum adiabatic expansion in the secondary expansion means, as shown in FIG. 5, and by point F in FIG. 6, valve $V_3$ is opened placing secondary expansion means in communication with surge tank 38 while mechanical energy from fly wheel 52 starts to return the secondary expansion means to its minimum volume as shown in FIG. 3. Valve $V_4$ is preferably controlled by the differential in pressure between the active volume of the heat-actuated regenerative compressor and the surge tank and valve $V_4$ opens at about point D as shown in FIG. 6 as vane 20 continues counterclockwise rotation as shown in FIG. 4. When the vane nears the end of its counterclockwise rotation, as shown in FIG. 5, the active volume of the compressor is at the minimum pressure-temperature condition as shown at point A in FIG. 6. The volume of the working fluid in the pressure translating system is returned to the active volume of the compressor, valve $V_4$ closing upon increase in pressure in the active volume of the compressor and the cycle repeated.

The area bounded by ABCD of the power system pressure-volume diagram of FIG. 6 represents the primary work performed by the primary expansion means while in communication with the working volume of the heat engine during the heating cycle of the engine. The working fluid of the heat engine, at the stage corresponding to point E in FIG. 6 contains substantial thermal energy as compared to the lowest thermal energy of the working fluid at the end of the cooling phase of the engine cycle. As described above, the portion of the working fluid contained in the pressure translating apparatus is isolated from the active volume of the heat engine and further adiabatically expanded by a secondary expansion means to about the minimum thermal energy of the heat engine working fluid, instead of being cooled down to the initial state of the cycle as the rest of the fluid.

The area EFG shown in FIG. 6 represents the additional work in the secondary expansion means, while isolated from the compressor. The overall additional work derived from the pressure translating system, isolated from the heat engine according to this invention, is in the order of 30 to 40 percent. Further advantages are obtained in the heat-actuated regenerative compressor by the working fluid being returned to the compressor at a lower temperature-pressure relationship, thus minimizing the load on both the regenerator and cooler.

The above described pressure translating system can be operated without valve $V_3$ and surge tank 38. Under such conditions valve $V_4$ and the secondary expansion means must be controlled in synchronization with the heat actuated regenerative compressor. Utilization of the surge tank permits desirable harmonic operation of the compressor and the secondary expansion means.

Figure 8:
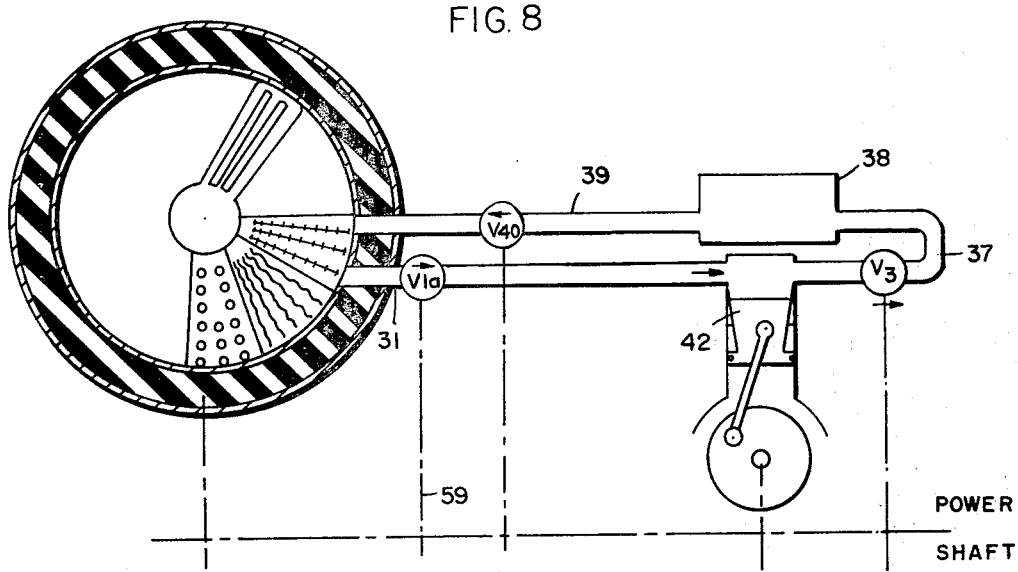
FIG. 8 shows the apparatus of one embodiment of this invention as a primer mover.

Another preferred embodiment of my invention is shown in FIG. 8 utilizing a single expander device which is in communication with the active volume of the heat engine for the heating phase of the engine cycle and isolated from the active volume of the heat engine for the early cooling phase of the engine cycle. This embodiment is especially useful when the apparatus of my invention is used as a prime mover. Conduit 31 has a first end in communication with the active volume of the heat engine and a second end in communication with expansion means 42. Valve $V_{10}$ is a controlled valve in conduit 31 and is opened during the heating phase of the heat engine cycle represented by FIGS. 1 and 2 and closed during the cooling phase of the cycle. Expansion means 42 functions as primary expansion means by direct expansion of the working fluid while valve $V_{10}$ is open and functions as secondary expansion means while $V_{10}$ is closed by further expansion under adiabatic conditions. Valve $V_{10}$ is preferably a controlled valve. Conduit 37 has a first end in communication with expansion means 42 and a second end in communication with surge tank 38. Valve $V_3$ is in conduit 37 and must be a controlled valve. Conduit 39 has a first end in communication with surge tank 38 and a second end in communication with the heat-actuated regenerative compressor active volume. Valve $V_{40}$ in conduit 39 is preferably a controlled valve in synchronization with the operation of the heat engine and the expansion means so that $V_{40}$ is open during the latter portion of the cooling phase within the heat engine and following adiabatic expansion in the isolated expansion means. When using a piston expander, as shown in FIG. 8, the entire mechanical output of the system is derived through the fly wheel shown and may be further converted by well-known means such as a magnetic coupling to useful work output or useful work and supercharging the exhaust of the heat engine. The apparatus can also function without valve $V_3$ and surge tank 38.

FIG. 7 shows a preferred embodiment of the pressure translating apparatus of this invention in combination with a cooling system wherein the primary expansion pressure-sensitive means is a piston type expander with oil backed bellows as described in U.S. Pat. No. 3,491,554 whereby the refrigerant condensor and evaporation pressures cooperate in the functioning of the primary expansion means. The operation cycle of the pressure translating apparatus is the same as schematically shown in FIGS. 1 through 5. The improved overall efficiency of the overall system is obtained by the secondary expansion means providing adiabatic expansion to about the lowest pressure of the heat engine cycle. The energy of the secondary expansion means is translated into mechanical energy which is extracted through fly wheel 52 and through linkage means 54 for powering the heat engine itself, the valves of the translating apparatus, auxiliary blowers and any excess removed. The primary expansion means is utilized directly as a pumping means for a closed cooling mechanism, or refrigerating system not shown, comprising a condenser means, expansion means, evaporation means and contained refrigerant.

Referring to the refrigeration apparatus as shown in FIG. 7, using helium as the working fluid of the heat-actuated regenerative compressor and Freon 22 as refrigerant in the refrigeration cycle, the apparatus of my invention, utilizing the isolated adiabatic expansion of working fluid from the heat engine, provides up to about 35 percent increase in the Coefficient Of Performance in the overall system as compared to the system utilizing a single expansion means directly in communication with the active volume of the heat engine. Under the same conditions using Freon 12 in the refrigeration system increased Coefficient Of Performance of up to about 38 percent may be obtained.

In designing a refrigeration system using the apparatus of my invention, it is desirable to seal the lower portion of the cylinder, shown as the secondary expansion means in FIG. 7, with the low pressure active volume of the heat actuated regenerative compressor to minimize the working fluid lost through the ring seal or other sealing device. Such design would permit a completely hermetically sealed unit.

Excess energy in the power shaft may be removed from the system through use of a magnetic coupling and coupled with a generator to obtain electrical energy for driving auxiliary equipment such as blowers as well as driving the vane of the heat actuated regenerative compressor and valving of the system, thus, an independent cooling system requiring minimal external energy input is obtained when utilizing the improved pressure translating apparatus of my invention.

In the above description of the preferred embodiment shown in FIG. 1 it was pointed that that surge tank 38 is preferred to permit harmonic operation of the system. Another method of obtaining harmonic operation of the system is to utilize two heat-actuated regenerative compressors and two pressure translating devices as shown in the balanced opposed system in FIG. 9. The system shown in FIG. 9 is a balanced opposed refrigeration system each half similar to the system shown in FIG. 7. In the operation of the apparatus shown in FIG. 9 the first heat-actuated regenerative compressor 1, primary expansion pressure sensitive means 32, and secondary expansion means 35 are each 180° out of phase with the second heat-actuated regenerative compressor 1a, primary expansion pressure sensitive means 32a and secondary expansion means 35a. The working fluid after undergoing adiabatic expansion, is passed into the opposite heat-actuated regenerative compressor from which it was removed for completion of the cycle. Thus, the entire system operates harmonically without the use of surge tank 38 as shown in FIG. 7. Obviously, it is possible to use heat engines and the pressure translating apparatus of my invention in other multiple combinations to obtain the benefits of increased power output afforded by the pressure translating apparatus of my invention.

It is readily seen from the earlier description of the operation of the apparatus of my invention that my invention includes a process for conversion of thermal energy of a heat engine having working fluid of alternate cycles of higher and lower temperature-pressure conditions into mechanical energy comprising passing a portion of the working fluid of the heat engine to a pressure expansion means during the increasing temperature-pressure phase of the heat engine cycle, then isolating said expansion means from the active volume of said heat engine and adiabatically expanding the working fluid contained in said expansion means to about the lowest pressure of the heat engine cycle during the early portion of the decreasing temperature-pressure phase of the heat engine cycle, then returning the working fluid contained in the pressure expansion means through a surge tank to the heat engine for recycling during the latter portion of the decreasing temperature-pressure phase of said heat engine cycle. This process is specifically illustrated by operation of the apparatus of FIG. 8.

My process for conversion of thermal energy to mechanical energy also includes utilization of a primary and a secondary expansion means as shown in FIGS. 1 through 5, 7 and 9. This embodiment for conversion of thermal energy of a heat engine having working fluid of alternate cycles of higher and lower temperature-pressure conditions into mechanical energy comprises passing a portion of the working fluid of the heat engine to a primary expansion means during the increasing temperature-pressure phase of the heat engine cycle, then placing said primary expansion means in communication with a secondary expansion means, both of said expansion means isolated from said active volume during the early portion of the decreasing temperature-pressure phase of the heat engine cycle, adiabatically expanding said working fluid contained in said secondary expansion means to about the lowest pressure of the heat engine cycle, and then returning the working fluid contained in said secondary expansion means to a heat engine for re-cycling during the latter portion of the decreasing temperature-pressure phase of said heat engine cycle.

As specifically illustrated in FIG. 7, the process of my invention also includes a process for cooling contained exterior atmosphere by a compression – condensation – expansion – evaporation cooling cycle, the improvement comprising the steps of compressing contained gaseous refrigerant by a primary pressure expansion means in communication during the refrigerant compression cycle with the active volume of a heat engine having working fluid of alternate cycles of higher and lower temperature-pressure conditions, isolating said primary expansion means from said active volume, placing said primary expansion means in communication with a secondary expansion means isolated from said active volume during the early portion of the decrease in temperature-pressure phase of the heat engine cycle, adiabatically expanding said working fluid contained in said secondary expansion means to about the lowest pressure of the heat engine cycle said secondary expansion means providing additional energy for operation of auxiliary apparatus, and returning the working fluid contained in said expansion means to a heat engine for re-cycling during the latter portion of the decrease in temperature-pressure phase of said heat engine. This process may be modified by operation of two similar heat engines and pressure translating devices wherein the working fluid is passed into the opposite heat engine after adiabatic expansion; the systems being 180° out of phase to provide harmonic operation.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a cooling apparatus comprising a heat-actuated regenerative compressor having a casing defining a gas chamber generally cylindrical in shape, an oscillatably-mounted shaft disposed through said chamber, a vane affixed to said shaft extending substantially the full length of said chamber and congruent with said casing dividing said chamber into a cold section and a hot section, a cooler in said cold section, a heater in said hot section, and a thermal regenerator therebetween, having working fluid of alternate cycles of higher and lower temperature-pressure conditions and a cooling mechanism comprising a compression means, a condenser means, expansion means, evaporation means and contained refrigerant, the improvement of: a pressure-sensitive primary expansion means; a first conduit having a first end in communication with the said chamber and a second end in communication with said primary expansion means serving as said compression means for said refrigerant; a first valve in said first conduit; a secondary expansion means having power linkage for extraction of mechanical energy; a second conduit having a first end in communication with said primary expansion means and a second end in communication with said secondary expansion means; a second valve in said second conduit; a third conduit having a first end in communication with said secondary expansion means and a second end in communication with said chamber; a third valve in said third conduit; and a power and synchronization linkage means between said heat-actuated regenerative compressor, said second and third valve and said secondary expansion means.

2. In a process for cooling contained exterior atmosphere by a compression – condensation – expansion – evaporation cooling cycle, the steps of compressing contained gaseous refrigerant by a primary expansion means in communication, during the increasing temperature-pressure phase of the heat-actuated regenerative compressor cycle and during the refrigerant compression cycle, with the active volume of a heat-actuated regenerative compressor having working fluid of alternate cycles of higher and lower temperature-pressure conditions; isolating said primary expansion means from said active volume; placing said primary expansion means in communication with a secondary expansion means isolated from said active volume during the early portion of the decrease in temperature-pressure phase of the heat-actuated regenerative compressor cycle; adiabatically expanding said working fluid contained in said secondary expansion means to about the lowest pressure of the heat-actuated regenerative compressor cycle, said secondary expansion means providing additional energy for mechanical extraction; and returning the working fluid contained in said secondary expansion means to the heat-actuated regenerative compressor for re-cycling during the latter portion of the decrease in temperature-pressure phase and the early portion of the increasing temperature-pressure phase of said heat-actuated regenerative compressor cycle, provided that all fluid may be returned during one of said phases.

3. The apparatus of claim 1 wherein said first valve is a differential pressure valve.

4. The apparatus of claim 1 having a surge tank in said third conduit between said third valve and said second end of said third conduit and a fourth valve in said third conduit between said surge tank and said second end of said third conduit.

5. The apparatus of claim 4 wherein said fourth valve is a differential pressure valve.

6. The process of claim 2 wherein said refrigerant is selected from the group consisting of Freon 12 and Freon 22.

* * * * *